United States Patent
Cho

(10) Patent No.: US 11,144,178 B2
(45) Date of Patent: Oct. 12, 2021

(54) METHOD FOR PROVIDING CONTENTS FOR MOBILE TERMINAL ON THE BASIS OF USER TOUCH AND HOLD TIME

(71) Applicant: Minsung Kim, Seoul (KR)

(72) Inventor: Hyung Suk Cho, Seoul (KR)

(73) Assignee: Minsung Kim, Seoul (KR)

( * ) Notice: Subject to any disclaimer, the term of this patent is extended or adjusted under 35 U.S.C. 154(b) by 0 days.

(21) Appl. No.: 16/480,406

(22) PCT Filed: Jun. 26, 2018

(86) PCT No.: PCT/KR2018/007199
§ 371 (c)(1),
(2) Date: Jul. 24, 2019

(87) PCT Pub. No.: WO2019/004687
PCT Pub. Date: Jan. 3, 2019

(65) Prior Publication Data
US 2021/0089177 A1   Mar. 25, 2021

(30) Foreign Application Priority Data
Jun. 26, 2017  (KR) .......................... 10-2017-0080470

(51) Int. Cl.
*G06F 3/0483* (2013.01)
*H04M 1/724* (2021.01)
(Continued)

(52) U.S. Cl.
CPC .......... *G06F 3/0483* (2013.01); *G06F 3/0488* (2013.01); *G06Q 30/0277* (2013.01); *G06Q 30/0641* (2013.01); *H04M 1/724* (2021.01)

(58) Field of Classification Search
None
See application file for complete search history.

(56) References Cited

U.S. PATENT DOCUMENTS

| | | | | |
|---|---|---|---|---|
| 2014/0184510 A1* | 7/2014 | Jeong | .................. | G06F 3/03543 345/163 |
| 2014/0298273 A1* | 10/2014 | Blackstone | ............. | G06F 3/011 715/863 |

(Continued)

FOREIGN PATENT DOCUMENTS

| | | |
|---|---|---|
| KR | 20120103923 | 9/2012 |
| KR | 20140025940 | 3/2014 |

(Continued)

OTHER PUBLICATIONS

International Search Report—PCT/KR2018/007199 dated Oct. 16, 2018.

*Primary Examiner* — Toan H Vu
(74) *Attorney, Agent, or Firm* — Maier & Maier, PLLC

(57) ABSTRACT

Provided is a method for providing contents for a mobile terminal on the basis of user touch and hold time, the method including the step of: recognizing a user's touch on a display screen through the mobile terminal and determining whether a position where the user's screen touch is recognized is constantly maintained for a given period of time; setting a popup region on a position spaced apart from the position where the screen is touched through the mobile terminal and displaying previously set contents corresponding to the touch and hold time on the popup region; and determining whether the touch is finished or not through the mobile terminal, and if it is determined that the touch is not finished, displaying the contents corresponding to the touch and hold time on the popup region.

6 Claims, 4 Drawing Sheets

(51) Int. Cl.
*G06F 3/0488* (2013.01)
*G06Q 30/02* (2012.01)
*G06Q 30/06* (2012.01)

(56) References Cited

U.S. PATENT DOCUMENTS

| | | | | |
|---|---|---|---|---|
| 2015/0020029 A1* | 1/2015 | Lee | ............... | G06F 3/016 |
| | | | | 715/825 |
| 2015/0135126 A1* | 5/2015 | Shao | ............... | G06F 3/0488 |
| | | | | 715/781 |
| 2015/0143423 A1* | 5/2015 | Park | ............... | G06F 3/041 |
| | | | | 725/40 |
| 2016/0004397 A1* | 1/2016 | Kim | ............... | G06F 3/0483 |
| | | | | 715/203 |
| 2016/0109954 A1* | 4/2016 | Harris | ............... | G06F 3/011 |
| | | | | 345/156 |
| 2016/0132074 A1* | 5/2016 | Kim | ............... | G06F 1/1652 |
| | | | | 715/769 |
| 2016/0357281 A1* | 12/2016 | Fleizach | ............... | G06F 3/0486 |
| 2018/0052571 A1* | 2/2018 | Seol | ............... | H04N 5/23216 |

FOREIGN PATENT DOCUMENTS

| | | |
|---|---|---|
| KR | 20150089813 | 8/2015 |
| KR | 101660803 | 9/2016 |
| KR | 101683868 | 12/2016 |
| KR | 101707444 | 2/2017 |

* cited by examiner

METHOD FOR PROVIDING CONTENTS FOR MOBILE TERMINAL ON THE BASIS OF USER TOUCH AND HOLD TIME

TECHNICAL FIELD

The present invention relates to a method for providing contents for a mobile terminal on the basis of user touch and hold time, and more particularly, to a method for in a time series providing previously set contents corresponding to given periods of time when a given region on a display is touched by a user.

BACKGROUND ART

As mobile communication technologies are developed, a mobile communication terminal performs a variety of functions, such as voice communication, short message sending, internet search, SNS (Social Network Service), and so on. As various works are carried out through a user's mobile communication terminal, particularly, it is necessary to operate a user interface more conveniently.

The operation of the user interface of the mobile communication terminal is carried out through swipe which runs the user interface through left and right movements of the user's finger, through pinch-in/out which reduces and expands the user interface with the user's two fingers, and through a 3D-touch which performs operations previously set according to touch sensitivity. Accordingly, there is a need to receive various contents through more convenient operation of the user interface.

One of conventional methods for operating a user interface is disclosed in Korean Patent No. 10-1683868 (entitled: Device, method and graphic user interface for transiting display states in response to gestures), but the operation of the user interface in the conventional method and device is carried out just on the basis of touch strength.

DISCLOSURE

Technical Problem

Accordingly, the present invention has been made in view of the above-mentioned problems occurring in the related art, and it is an object of the present invention to provide a method and system for providing a plurality of contents in a time series only through touch and hold operations using a user's one finger.

Technical Solution

To accomplish the above-mentioned object, according to the present invention, there is provided a method for providing contents for a mobile terminal on the basis of user touch and hold time, the method including the step of: recognizing a user's touch on a display screen through the mobile terminal and determining whether a position where the user's screen touch is recognized is constantly maintained for a given period of time; setting a popup region on a position spaced apart from the position where the screen is touched through the mobile terminal and displaying previously set contents corresponding to the touch and hold time on the popup region; and determining whether the touch is finished or not through the mobile terminal, and if it is determined that the touch is not finished, displaying the contents corresponding to the touch and hold time on the popup region.

Advantageous Effects

According to the present invention, the method for providing contents for a mobile terminal can be carried out by displaying the contents according to the user touch and hold time, thereby providing various information for the user through the user's simple touch operation.

Further, the method according to the present invention can run the mobile terminal more conveniently through the operation using the user's one finger.

Furthermore, the method according to the present invention allows the mobile terminal to move to the link page if the user's touch is finished, so that the user purchases a selected product or moves to another application, thereby providing more convenient user interface for the user.

MODE FOR INVENTION

Figure 1:
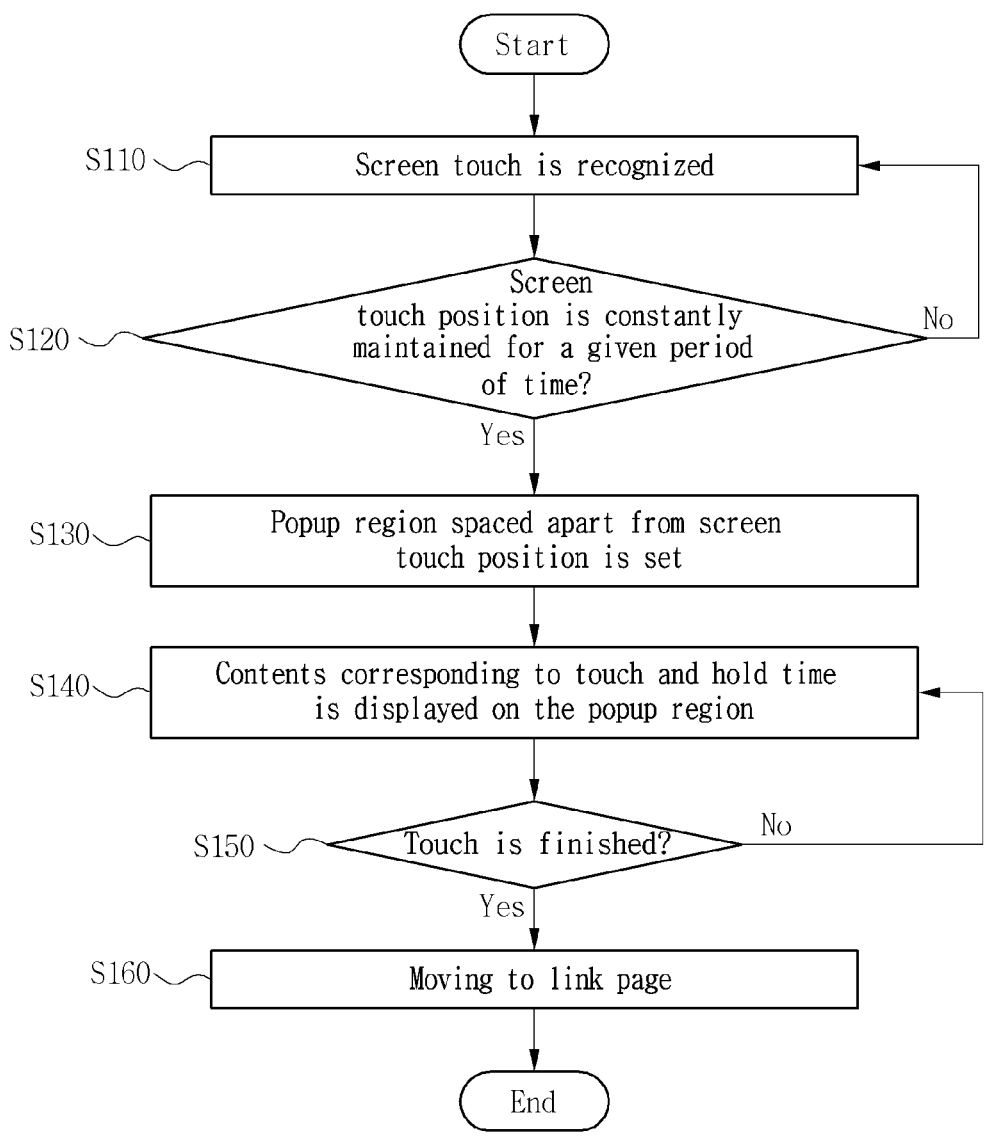
FIG. 1 is a flowchart showing a method for providing contents for a mobile terminal according to a first embodiment of the present invention.

Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Hereinafter, the present invention will be in detail explained with reference to the attached drawing.

FIG. 1 is a flowchart showing a method for providing contents for a mobile terminal according to a first embodiment of the present invention.

According to the first embodiment of the present invention, as shown in FIG. 1, a method for providing contents for a mobile terminal on the basis of user touch and hold time includes the step of recognizing a user's touch on a display screen through a touch recognizing part of the mobile terminal (at step S110).

If the screen touch is recognized through the touch recognizing part of the mobile terminal, next, the method includes the step of determining whether a position where the screen touch is recognized is constantly maintained for a given period of time (at step S120). According to the present invention, the user using the mobile terminal touches a specific menu through his or her one finger to allow the information on a specific object to be displayed on the display screen, but while being not limited thereto, of course, the user may directly touch the specific object to receive contents information.

If the user touch is constantly maintained for the given period of time, after that, the method includes the step of setting a popup region on a position spaced apart from the position where the screen is touched through the mobile terminal (at step S130). The popup region is displayed on a center of the display, but it is not limited thereto. The popup region may be laid on top of the specific object.

Next, the method includes the step of displaying previously set contents corresponding to the touch and hold time on the popup region through the mobile terminal (at step S140). Next, it is determined whether the touch is finished or not through the mobile terminal, and if it is determined that the touch is not finished, the method includes the step of displaying the contents corresponding to the touch and hold time on the popup region (at step S150).

After that, it is determined whether the touch is finished or not through the mobile terminal, and if it is determined that the touch is finished, the popup region is closed to move to a new page. According to the present invention, if the touch is finished, new contents or information related to purchase may be provided on the popup region.

Figure 2:
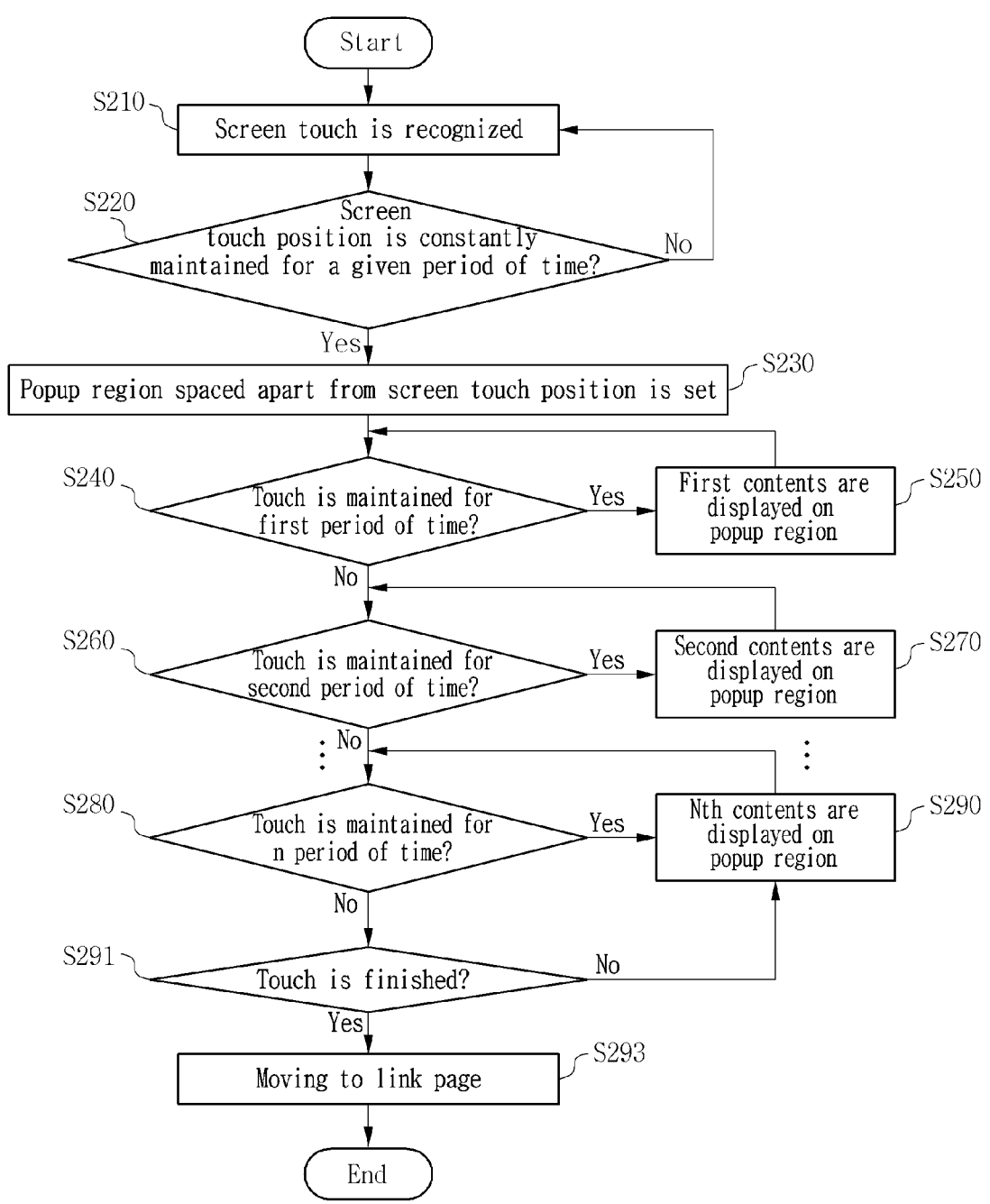
FIG. 2 is a flowchart showing a method for providing contents for a mobile terminal according to a second embodiment of the present invention.

FIG. 2 is a flowchart showing a method for providing contents for a mobile terminal according to a second embodiment of the present invention.

As shown in FIG. 2, the method for providing contents for a mobile terminal according to the second embodiment of the present invention includes touch and hold time constituted of a first period of time, a second period of time, and a third period of time previously set, and a plurality of contents corresponding to the first, second and third periods of time are mapped and displayed in a time series. The first period of time, the second period of time, and the third period of time are received from a server, and otherwise, they may become values previously inputted and stored by the user. The first period of time, the second period of time, and the third period of time are the time kept after initially inputted touch. For example, the first period of time is one second, the second period of time is three seconds, and the third period of time is five seconds, but of course, they are not limited thereto.

If the touch is maintained for the first period of time, first contents are displayed on the popup region (at step S240), if the touch is maintained for the second period of time, second contents are displayed on the popup region (at step S260), and if the touch is maintained for an n period of time, nth contents are displayed on the popup region (at step S280). The first contents include an advertisement page, and the second contents include product information and sales information. The plurality of contents corresponding to the touch and hold time set by the user are displayed and provided in a time series for the user.

After that, it is determined whether the touch is finished or not through the mobile terminal, and if it is determined that the touch is finished, the popup region is closed to move to a new page. If the page is a purchase page, information is provided to allow the user to purchase a specific product. If it is determined that the touch is finished, new contents or purchase information may be provided on the popup region, without moving to the new page.

Figure 3:
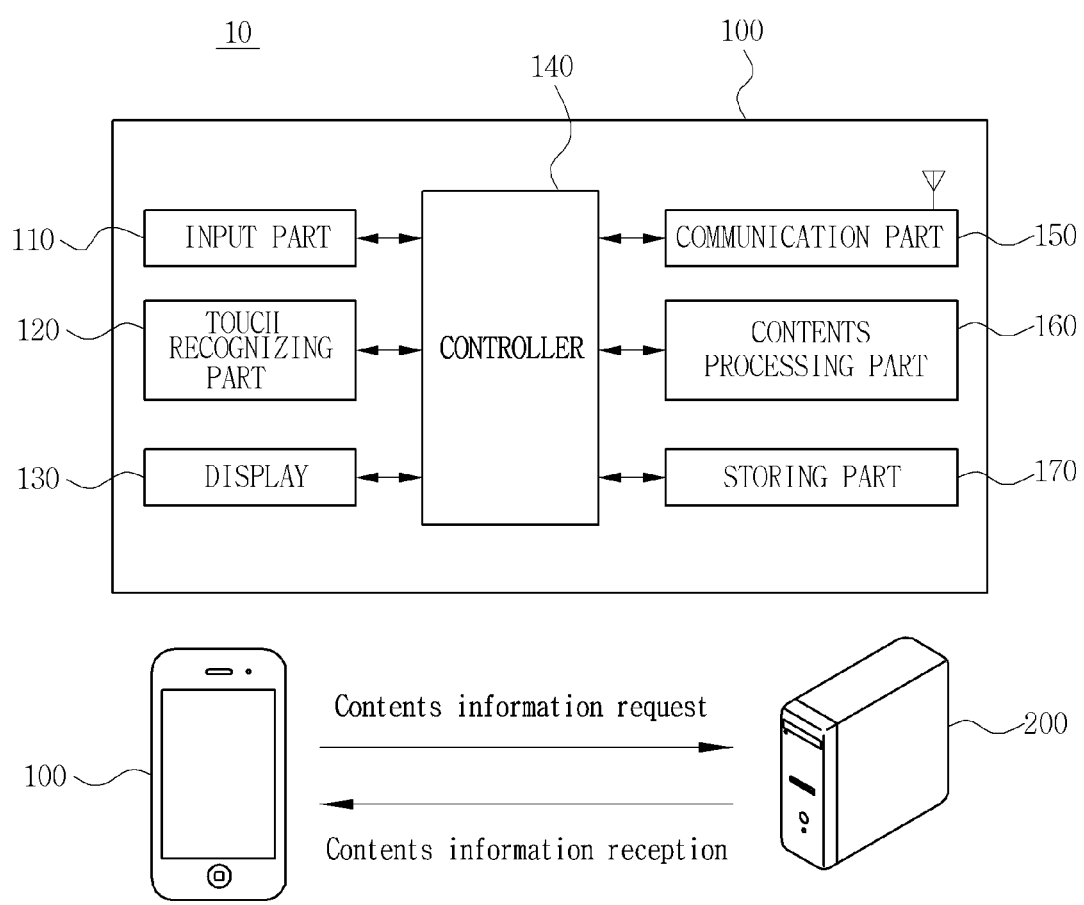
FIG. 3 is a block diagram showing a system for providing contents according to the present invention.

FIG. 3 is a block diagram showing a system for providing contents according to the present invention.

As shown in FIG. 3, a system 10 for providing contents according to the present invention largely includes a mobile terminal 100 and a server 200. The mobile terminal 100 requests the server 200 to send contents information and thus receives the contents information from the server 200. According to the present invention, otherwise, the mobile terminal 100 does not receive the contents information from the server 200, but the mobile terminal 100 collects and processes the contents information by itself. Further, the mobile terminal 100 can collect the contents information through the communication with Internet of Things devices.

The mobile terminal 100 includes an input part 110, a touch recognizing part 120, a display 130, a controller 140, a communication part 150, a contents processing part 160, and a storing part 170. According to the present invention, the mobile terminal 100 is a mobile computing device like a smartphone, tablet PC, and so on, which executes determined processes through an operating system software and various application software and is easily carried with the user and utilized, while being moved. However, the mobile terminal 100 is not limited necessarily thereto.

The input part 110 receives an input event carried out by input means. The input part 110 is a touch screen which sends the touched event to the touch recognizing part 120. The input part 110 generates input data through which the user controls operations of the mobile terminal 100. The input part 110 may be constituted of a button or touch sensor (resistive/capacitive) located on the front, rear, or side surface of the mobile terminal 100.

The touch recognizing part 120 recognizes a position where the user's touch occurs and the user's touch and hold time on the basis of the user's touch event. The touch recognizing part 120 senses current states of the mobile terminal 100, such as the opening and closing state of the mobile terminal 100, the location of the mobile terminal 100, the occurrence of user contact, the direction of the mobile terminal 100, and acceleration/deceleration of the mobile terminal 100, to generate the sensed signals for controlling the operations of the mobile terminal 100. The touch recognizing part 120 includes a proximity sensor.

The display 130 displays various contents on the basis of the user's touch. In this case, the contents include web contents, application contents, documents, and messages. Further, the contents include digital contents, multimedia contents, and internet contents, and the display 130 displays the contents on a specific region on the basis of the user's touch. Also, the display 130 can display the plurality of contents on the specific region simultaneously, and otherwise, it can divide the specific region and display the contents on the divided specific regions. If the display 130 and the touch sensor are laid on each other or integrally formed with each other (hereinafter, referred to as 'touch screen'), the display 130 can be used as an input device as well as an output device. For example, if the touch sensor has a shape of a touch film, a touch sheet, or a touch pad, the touch sensor is laid on top of the display 130, and otherwise, the touch sensor may be integrally formed with the display 130. The touch sensor converts a pressure applied to a specific region of the display 130 or a change in capacitance generated on the specific region of the display 130 into an electrical input signal. The touch sensor can detect the position as well as area where the user's touch occurs and the pressure generated upon the touch.

The controller 140 serves to control the process related to the execution of the application software and also to control the operations of the respective parts of the mobile terminal 100. The controller 140 can control the process related to the execution through the application software and the web browser on the World Wide Web. The controller 140 sets the specific region on which the contents are displayed according to the user's input.

The communication part 150 is a communication module serving to send and receive data to and from an external device. The communication part 150 requests the server 200 to send the contents information and thus receives the contents information from the server 200.

The contents processing part 160 can set the respective contents corresponding to the touch and hold time previously set by the user. For example, the touch and hold time is set to a first period of time, a second period of time, a third period of time, and an nth period of time previously set, and also, first contents, second contents, third contents and nth contents corresponding to the first period of time, the second period of time, the third period of time, and the nth period of time can be set.

The storing part 170 stores the touch and hold time, the contents corresponding to the respective touch and hold time, and URL of a link page.

According to the present invention, in detail, various contents are displayed according to the touch and hold time using the user's one finger, thereby providing various information for the user through the user's simple touch operation.

Figure 4:
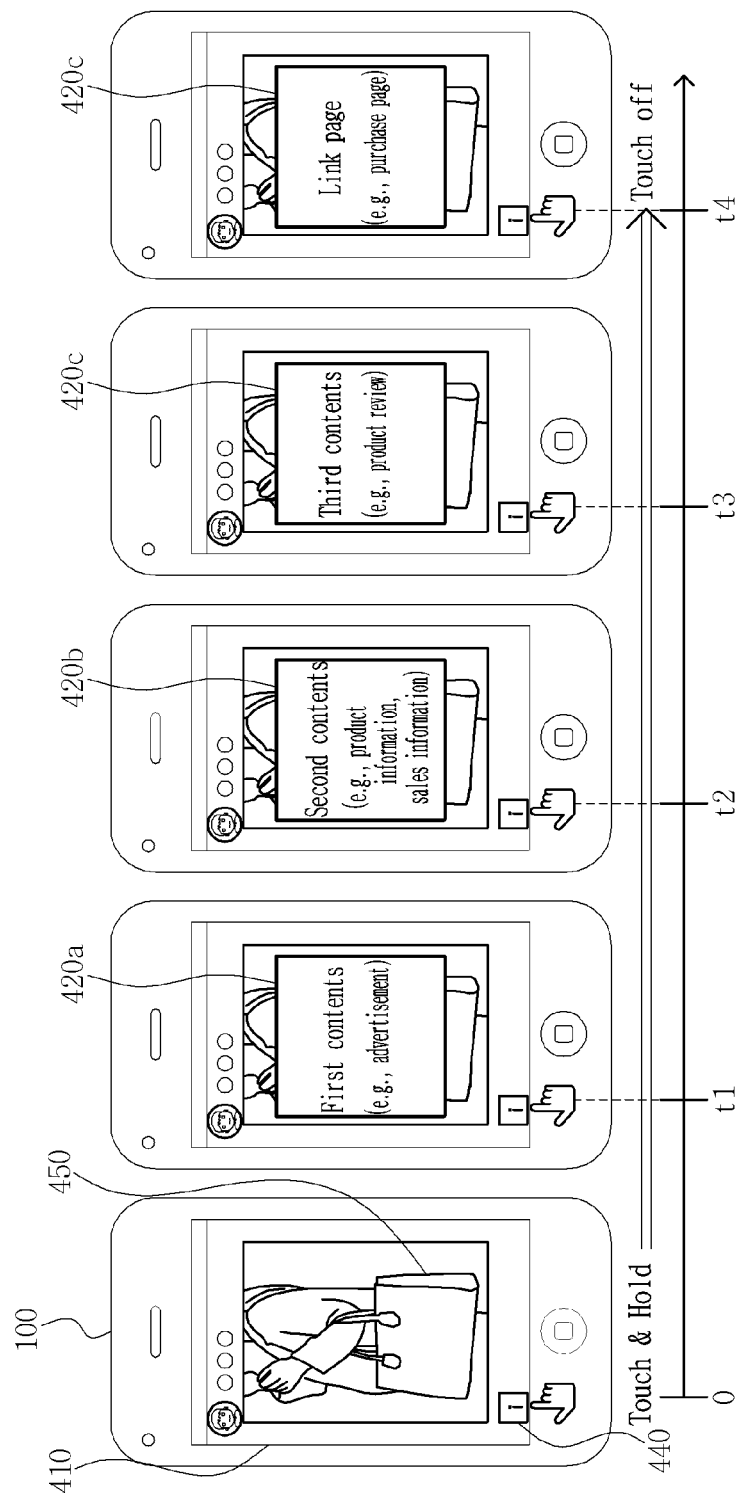
FIG. 4 is an exemplary view showing the method for providing contents for the mobile terminal according to the first embodiment of the present invention.

FIG. 4 is an exemplary view showing the method for providing contents for the mobile terminal according to the first embodiment of the present invention.

As shown in FIG. 4, an application is executed on the mobile terminal 100, and so as to allow the user to obtain detailed information on a specific product 450 displayed on the application, an information menu 440 related to the specific product 450 is touched by the user. The mobile terminal 100 recognizes the user's touch and thus displays the contents (for example, advertisement, sales information, and product review related to the specific product 450) according to the touch and hold time on the specific region in a time series. Accordingly, the contents related to the specific product can be easily provided for the user only through the touch and hold time using his or her one finger, and if the touch is finished, moving to the sales page of the specific product is carried out so that the specific product can be simply and rapidly purchased. According to the present invention, the contents on the moving page are not limited, and other contents may be of course provided on the popup region, without moving to the page. According to the present invention, one information menu 440 is displayed, but a plurality of information menus may be displayed, while having upper and lower menus. If it is desired to finish the touch, further, the user's finger moves in every direction, while being touched on the screen, and otherwise, it strongly presses the screen to perform another action.

The first contents are displayed for the first period of time t1, and if the second period of time t2 comes in the state where the touch is maintained, the second contents are displayed. If the third period of time t3 comes in the state where the touch is maintained, the third contents are displayed. Displaying the contents is finished if the fourth period of time t4 at which the touch is finished comes, and moving to the link page is carried out on the basis of the ling page URL previously stored in the storing part. The link page can be connected to the purchase page for purchasing the selected product. For example, the first contents include an advertisement page, the second contents include a product information and sales information page, and the third contents include a product review page, but they are not limited thereto.

As described above, the method according to the present invention displays various contents and runs the link page or another application according to the touch and hold time occurring through only one finger of the user, thereby providing more intuitive user interface for the user.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. It is therefore intended that the scope of the invention be limited not by this detailed description, but rather by the claims appended hereto.

The invention claimed is:

1. A method for providing contents for a mobile terminal on the basis of user touch and hold time, the step of:
    (a) recognizing a user's touch on a display screen through the mobile terminal and determining whether a position where the user's screen touch is recognized is constantly maintained for a given period of time;
    (b) setting a popup region on a position spaced apart from the position where the screen is touched through the mobile terminal and displaying previously set contents corresponding to the touch and hold time on the popup region;
    (c) determining whether the touch is finished or not through the mobile terminal, and if it is determined that the touch is not finished, displaying the contents corresponding to the touch and hold time on the popup region; and
    (d) determining whether the touch is finished or not through the mobile terminal, and if it is determined that the touch is finished after maintaining for the given period of time, moving to a link page,
    wherein the popup region is displayed directly after the user's screen touch is maintained for the given period of time, absent an intervening performance of the mobile terminal for the display screen,
    wherein the display screen moves to the link page when the touch is finished after maintaining for the given period of time, absent a further input of the user,
    wherein the popup region is displayed on the position spaced apart from the position where the screen is touched such that the popup region is visible for the user,
    wherein a specific object on the display screen is touched by the user, and the popup region is laid on above from the specific object.

2. The method according to claim 1, wherein at the step (b) the touch and hold time has a first period of time, a second period of time, and a third period of time previously set, and the contents corresponding to the first, second and third periods of time are stored.

3. The method according to claim 2, wherein if the touch is maintained for the first period of time, the first contents are displayed on the popup region, if the touch is maintained for the second period of time, the second contents are displayed on the popup region, and if the touch is maintained for the third period of time, the third contents are displayed on the popup region.

4. The method according to claim 3, wherein the first contents have an advertisement page, the second contents have a product information and sales information page, and the third contents have a product review page.

5. The method according to claim 1, wherein at the step (a), the user's screen touch is carried out with the user's one finger.

6. The method according to claim 2, wherein the first period of time is one second, the second period of time is three seconds, and the third period of time is five seconds.

* * * * *